US012558749B2

(12) United States Patent　　　　(10) Patent No.: US 12,558,749 B2
Svoboda　　　　　　　　　　　　　　(45) Date of Patent: Feb. 24, 2026

(54) POSITIONING APPARATUS AND SYSTEM

(71) Applicant: ABB Schweiz AG, Baden (CH)

(72) Inventor: Petr Svoboda, Västerås (SE)

(73) Assignee: ABB Schweiz AG, Baden (CH)

( * ) Notice: Subject to any disclaimer, the term of this patent is extended or adjusted under 35 U.S.C. 154(b) by 922 days.

(21) Appl. No.: 17/756,884

(22) PCT Filed: Dec. 10, 2019

(86) PCT No.: PCT/EP2019/084496
　　§ 371 (c)(1),
　　(2) Date: Jun. 3, 2022

(87) PCT Pub. No.: WO2021/115577
　　PCT Pub. Date: Jun. 17, 2021

(65) Prior Publication Data
US 2023/0010750 A1　　　Jan. 12, 2023

(51) Int. Cl.
　　B23Q 1/66　　　　(2006.01)
　　B23K 9/00　　　　(2006.01)
　　　　　　(Continued)

(52) U.S. Cl.
　　CPC .............. B23Q 1/66 (2013.01); B23K 9/0026 (2013.01); B23K 37/04 (2013.01); B23K 37/053 (2013.01);
　　　　　　(Continued)

(58) Field of Classification Search
　　CPC ........ B23Q 1/66; B23K 9/0026; B23K 37/04; B23K 37/053; B23K 2101/04; B25J 9/0096; Y10S 901/42
　　See application file for complete search history.

(56) References Cited

U.S. PATENT DOCUMENTS 4,666,363 A　　5/1987　Johansson
5,074,741 A　*　12/1991　Johansson ................ B23Q 5/00
　　　　　　　　　　　　　　　　901/6
　　　　　　　(Continued)

FOREIGN PATENT DOCUMENTS

CN　　　　1575921 A　　2/2005
CN　　205271294 U　　6/2016
　　　　　　(Continued)

OTHER PUBLICATIONS

International Preliminary Report on Patentability; Application No. PCT/EP2019/084496 ; Issued May 17, 2022; 8 Pages.
　　　　　　(Continued)

*Primary Examiner* — Steven W Crabb
*Assistant Examiner* — Dilnessa B Belay
(74) *Attorney, Agent, or Firm* — Whitmyer IP Group LLC

(57) ABSTRACT

A positioning apparatus including a base structure; a first workpiece support; a second workpiece support; a support member supporting the first workpiece support and the second workpiece support; and a drive arrangement arranged to drive the support member relative to the base structure from a first position, where the first workpiece support is positioned on a processing side of the base structure and the second workpiece support is positioned on an opposite loading side of the base structure, to a second position, where the first workpiece support is positioned on the loading side and the second workpiece support is positioned on the processing side; wherein the drive arrangement is arranged to drive the first workpiece support along a first path and the second workpiece support along a second path when driving the support member from the first position to the second position, the first and second paths being non-circular.

20 Claims, 9 Drawing Sheets

(51) Int. Cl.

| | |
|---|---|
| *B23K 37/04* | (2006.01) |
| *B23K 37/053* | (2025.01) |
| *B23K 101/04* | (2006.01) |
| *B25J 9/00* | (2006.01) |

(52) U.S. Cl.
CPC ......... *B25J 9/0096* (2013.01); *B23K 2101/04* (2018.08); *Y10S 901/42* (2013.01)

(56) References Cited

U.S. PATENT DOCUMENTS

| | | | | |
|---|---|---|---|---|
| 5,617,622 | A | 4/1997 | Anderson | |
| 6,264,418 | B1 * | 7/2001 | Michael ................... | B23Q 1/66 |
| | | | | 414/733 |
| 8,338,751 | B2 * | 12/2012 | Larkins .............. | B23K 37/0452 |
| | | | | 219/136 |
| 2015/0014714 | A1 | 1/2015 | Lin et al. | |

FOREIGN PATENT DOCUMENTS

| | | | |
|---|---|---|---|
| CN | 209363991 | U | 9/2019 |
| DE | 1752669 | A1 | 7/1972 |
| DE | 10322850 | A1 | 12/2004 |
| EP | 1002620 | A1 | 5/2000 |
| EP | 3017910 | A2 | 5/2016 |
| WO | 2014058397 | A1 | 4/2014 |
| WO | 2016141494 | A1 | 9/2016 |

OTHER PUBLICATIONS

Chinese Office Action; Application No. 2019801026635; Completed May 30, 2024; 21 Pages.

Chinese Second Office Action; Application No. 201980102663.5; Completed: Sep. 13, 2024; 15 Pages.

International Search Report and Written Opinion of the International Searching Authority; Application No. PCT/EP2019/084496; Completed: Aug. 27, 2020; Mailing Date: Sep. 15, 2020; 12 Pages.

* cited by examiner

POSITIONING APPARATUS AND SYSTEM

TECHNICAL FIELD

The present disclosure generally relates to a positioning apparatus. In particular, a positioning apparatus for positioning workpieces in relation to an industrial robot, and a system comprising an industrial robot and a positioning apparatus, are provided.

BACKGROUND

Workpiece positioners with a horizontal interchange axis for positioning workpieces in relation to an industrial robot are widely used in the industry today. FIG. 12 shows an industrial robot 12 and a workpiece positioner 80. The workpiece positioner 80 comprises a horizontal interchange axis 78, a processing side 32 where a first workpiece 24 can be processed by the industrial robot 12 and a loading side 34 for loading/unloading a second workpiece 26 at the same time as the first workpiece 24 is processed. Such workpiece positioners 80 have many advantages compared to workpiece positioners with a vertical interchange axis.

One advantage is the possibility to accommodate long workpieces 24 and 26 and still maintain a relatively compact footprint. A further advantage is that a good reach of the workpiece 24 by the industrial robot 12 is enabled because the industrial robot 12 can be positioned close to the workpiece 24. In contrast to workpiece positioners having a vertical interchange axis, for a workpiece positioner 80 with a horizontal interchange axis 78, the positioning of the industrial robot 12 is not dependent on the length of the workpiece 24 and 26. A further advantage is that a short distance to a safety light curtain on the loading side 34 is enabled.

However, one major disadvantage of workpiece positioners 80 with only one horizontal interchange axis 78 is that a workpiece axis 28 on the processing side 32 becomes positioned high above the floor 16. This high positioning makes it difficult, unsafe, and costly to do programming, touch-ups, and maintenance activities.

For ergonomic reasons, a height of a workpiece axis 30 above the floor 16 at the loading side 34 is typically set low. As a consequence, a height of a workpiece axis 28 above the floor 16 at the processing side 32 becomes high. The larger the workpieces 24 and 26 are (e.g. diameters thereof), the larger the height of the workpiece axis 28 above the ground on the processing side 32 needs to be. The processing side 32 of the workpiece positioner 80 is not only a place where the industrial robot 12 operates, there is also typically a frequent need for manual work at the processing side 32, such as for robot programmers and maintenance personnel. For example, in arc welding applications, touch-up (or lead-through) programming during production is common.

The robot programmer often cannot perform programming and touch-ups of robot trajectories properly if he or she is not very close to the workpiece 24 and in an ergonomic and safe working environment. For larger workpieces 24, an additional platform and/or a ladder may be used in order for the programmer to reach closer to the workpiece 24. Such additional platform may add significant costs due to the kinematic requirements of the platform and the workpiece positioner 80. In case a ladder is used, health and safety are endangered. For such workpiece positioners 80, the industrial robot 80 is also often placed on a tall pedestal 82 in order to reach the workpiece 24 on the processing side 32, which adds costs and height.

U.S. Pat. No. 6,264,418 B1 discloses a workpiece positioner which is adapted to move a workpiece from a load/unload zone to a work zone spaced from the load/unload zone. The workpiece positioner comprises a first stationary frame, a second frame coupled to the first frame so as to be rotatable relative to the first frame about a first axis, a first drive device for effecting rotation of the second frame about the first axis, and a first workpiece holder adapted to releasably receive a workpiece.

SUMMARY

One object of the present disclosure is to provide a positioning apparatus for positioning workpieces in relation to an industrial robot, which positioning apparatus is cost-effective and/or enables cost-effective operation.

A further object of the present disclosure is to provide a positioning apparatus for positioning workpieces in relation to an industrial robot, which positioning apparatus is safe and/or enables safe operation.

A still further object of the present disclosure is to provide a positioning apparatus for positioning workpieces in relation to an industrial robot, which positioning apparatus has a compact design.

A still further object of the present disclosure is to provide a positioning apparatus for positioning workpieces in relation to an industrial robot, which positioning apparatus has a simple design.

A still further object of the present disclosure is to provide a positioning apparatus for positioning workpieces in relation to an industrial robot, which positioning apparatus is ergonomic and/or enables ergonomic operation.

A still further object of the present disclosure is to provide a positioning apparatus for positioning workpieces in relation to an industrial robot, which positioning apparatus solves several or all of the foregoing objects in combination.

A still further object of the present disclosure is to provide a system comprising an industrial robot and a positioning apparatus, which system solves one, several or all of the foregoing objects.

According to one aspect, there is provided a positioning apparatus for positioning workpieces in relation to an industrial robot, the positioning apparatus comprising a base structure; a first workpiece support for supporting a first workpiece; a second workpiece support for supporting a second workpiece; a support member supporting the first workpiece support and the second workpiece support; and a drive arrangement arranged to drive the support member relative to the base structure from a first position, where the first workpiece support is positioned on a processing side of the base structure and the second workpiece support is positioned on an opposite loading side of the base structure, to a second position, where the first workpiece support is positioned on the loading side and the second workpiece support is positioned on the processing side; wherein the drive arrangement is arranged to drive the first workpiece support along a first path and the second workpiece support along a second path when driving the support member from the first position to the second position, the first and second paths being non-circular.

When the drive arrangement drives the support member from the first position to the second position, the support member may move relative to the base structure in two axes. One axis may be a rotational axis and the other axis may be either a rotational axis or a translational axis. Due to the non-circular first and second paths, the support member is configured to perform a compound movement between the first position and the second position. In this way, the positioning apparatus can be made more compact and can position a first workpiece on the processing side at a low height and a second workpiece on the loading side at a low height. This in turn improves ergonomics and safety, and reduces costs.

When a first workpiece is supported by the first workpiece support on the processing side, the industrial robot can perform an operation, such as welding, on the first workpiece. At the same time, a second workpiece can be loaded (or unloaded) to (or from) the second workpiece support on the loading side. The positioning apparatus thus enables simultaneous processing and loading/unloading of workpieces.

The base structure is arranged between the processing side and the loading side. The base structure may be fixed to the ground. The base structure may alternatively be referred to as a positioner base.

The first workpiece support may be configured to rotate a first workpiece about a first workpiece axis. The second workpiece support may be configured to rotate a second workpiece about a second workpiece axis. Each of the first workpiece axis and the second workpiece axis may be substantially horizontal, or horizontal. Furthermore, each of the first workpiece support and the second workpiece support may be configured to releasably hold a workpiece.

The first workpiece support may comprise two first workpiece support members arranged to hold a workpiece therebetween. One of the first workpiece support members may be supported by a bearing for rotation relative to the support member about the first workpiece axis. The first workpiece support may further comprise a servomotor and a reduction gearbox at the other first workpiece support member for rotationally driving the workpiece about the first workpiece axis.

The second workpiece support may comprise two second workpiece support members arranged to hold a workpiece therebetween. One of the second workpiece support members may be supported by a bearing for rotation relative to the support member about the second workpiece axis. The second workpiece support may further comprise a servomotor and a reduction gearbox at the other second workpiece support member for rotationally driving the workpiece about the second workpiece axis.

When the support member is in the first position or in the second position, also the positioning apparatus may be said to be in the first position or in the second position, respectively. The positioning apparatus may alternatively be referred to as a workpiece positioner. The support member may comprise a rigid frame.

In each of the first position and the second position, the first workpiece support and the second workpiece support may be positioned at substantially the same, or the same, geodetic height. Thus, a processing height at the processing side and a loading height at the loading side of the positioning apparatus may be the same. For example, the first workpiece axis and the second workpiece axis may be positioned at substantially the same, or the same, geodetic height in each of the first position and the second position. This enables the workpieces to be positioned in an ergonomic height both on the processing side and on the loading side, e.g. for operators, programmers and/or maintenance personnel.

The positioning apparatus according to this variant thus comprises a kinematic solution allowing for equal loading and processing height of the workpiece axes above the ground. Due to the low processing height, costs are reduced, and safety is improved. For example, costs associated with equipment for programming of the industrial robot at a large height, such as a platform, can be avoided. Furthermore, safety issues associated with a large height at the processing side, such as the use of a ladder, can be avoided.

The one of the first and second paths being above the other path may have a first vertical height, and the one being below may have a second vertical height, and the first vertical height may be larger than the second vertical height. For example, the first vertical height may be at least two times larger, such as at least three times larger, such as at least four times larger, such as at least five times larger, than the second vertical height.

The first workpiece support may move from processing side to the loading side below the second workpiece support along a relatively short generally double arc-shaped path. At the same time, the second workpiece support may move from the loading side to the processing side above the first workpiece support along a relatively long generally arc-shaped path or elliptic path.

The drive arrangement may comprise a motor. In this case, the drive arrangement may be arranged to drive the support member from the first position to the second position with the motor as the sole power source. Thus, the drive arrangement can drive the support member to perform the compound movement by only one motor. The drive arrangement does thereby not necessarily require an additional driven axis in comparison with some prior art horizontal workpiece positioners.

The positioning apparatus may comprise, or constitute, a kinematic chain where the motor is the input, and the support member is the output. A position of the support member may be a function of a rotational position of the motor. The motor may for example be an electric motor, such as an electric servomotor. The drive arrangement may further comprise a reduction gearbox connected to an output shaft of the motor.

The drive arrangement may comprise an intermediate member between the base structure and the support member, and a substantially horizontal, or horizontal, primary rotation axis between the base structure and the intermediate member. In this case, the positioning apparatus may be referred to as a horizontal positioner.

The intermediate member is then arranged to rotate relative to the base structure about the primary rotation axis.

The primary rotation axis may be referred to as an interchange axis. The intermediate member may be an arm. The positioning apparatus may comprise one or more bearings for rotationally supporting the intermediate member relative to the base structure about the primary rotation axis.

The drive arrangement may be arranged to rotate the intermediate member approximately 360°, such as 340° to 380°, such as 360°, about the primary rotation axis when driving the support member from the first position to the second position. The intermediate member may be driven to rotate by a motor. For example, the intermediate member may be connected to an output shaft of a reduction gearbox between the motor and the intermediate member.

The drive arrangement may be arranged to drive the support member from the first position to the second position such that a distance between the first workpiece support and the primary rotation axis and/or a distance between the second workpiece support and the primary rotation axis varies. In other words, the drive arrangement may be arranged such that a distance between the first workpiece support and the primary rotation axis and/or a distance between the second workpiece support and the primary rotation axis varies while the support member is driven by the drive arrangement from the first position to the second position.

The drive arrangement may comprise a motor arranged to drive the intermediate member about the primary rotation axis. The drive arrangement may further comprise a reduction gearbox between the motor and the drive arrangement.

The drive arrangement may comprise a substantially horizontal, or horizontal, secondary rotation axis between the intermediate member and the support member, the secondary rotation axis being parallel with the primary rotation axis. In this case, the support member may be arranged to rotate relative to the base structure about the secondary rotation axis. The intermediate member is thereby both rotatable relative to the base structure about the primary rotation axis and rotatable relative to the support member about the secondary rotation axis.

The secondary rotation axis, the first workpiece axis and the second workpiece axis may be positioned at substantially the same, or the same, geodetic height in each of the first position and the second position. The positioning apparatus may comprise one or more bearings for rotationally supporting the support member relative to the intermediate member about the secondary rotation axis. The secondary rotation axis may be centered between the first workpiece axis and the second workpiece axis.

Although the present disclosure mainly exemplifies a solution comprising two rotational axes, alternative solutions are possible. For example, instead of the secondary rotation axis, the intermediate member may comprise a linear actuator, e.g. a telescopic member. Also in this way, the drive arrangement can drive the first and second workpiece supports along first, and second non-circular paths and the compound movement can be carried out.

As a possible further alternative solution, instead of the secondary rotation axis, the base structure may comprise a linear actuator. Also in this way, the drive arrangement can drive the first and second workpiece supports along first, and second non-circular paths and the compound movement can be carried out.

The drive arrangement may be arranged to rotate the support member approximately 180°, such as 170° to 190°, such as 180°, about the secondary rotation axis when driving the support member from the first position to the second position.

The drive arrangement may comprise a transmission having an input wheel fixed with respect to the base structure and an output wheel fixed with respect to the support member. In this case, a gear ratio between the input wheel and the output wheel may be 2:1.

The drive arrangement may comprise a stationary first gear wheel concentric with the primary rotation axis, a second gear wheel meshing with the first gear wheel and rotatably connected to the intermediate member, and a third gear wheel meshing with the second gear wheel, fixed with respect to the support member and concentric with the secondary rotation axis. In this case, the first gear wheel may constitute an input wheel as described herein and the third gear wheel may constitute an output wheel as described herein.

The first gear wheel is thus fixed relative to the base structure. When the intermediate member is rotationally driven about the primary rotation axis relative to the base structure by the motor, the rotation of the intermediate member is transferred to a rotation of the second gear wheel on the intermediate member about a second gear wheel axis. Rotation of the second gear wheel in turn causes the support member to be rotationally driven about the secondary rotation axis relative to the intermediate member.

Each of the first gear wheel, the second gear wheel and the third gear wheel may be a spur gear. The gear ratio between the first gear wheel and the third gear wheel may be 2:1. As an alternative to a gear train, the transmission may comprise a belt drive.

As a possible alternative to a gear train comprising three gear wheels or other transmission, the drive arrangement may comprise an additional motor, and optionally an additional reduction gearbox, for driving the support member relative to the intermediate member about the secondary rotation axis.

The positioning apparatus may further comprise a passive arrangement. The passive arrangement may, together with the drive arrangement, be arranged to kinematically define the position of the support member in relation to the base structure. In this case, the support member may be supported between the drive arrangement and the passive arrangement.

The passive arrangement may comprise a passive kinematic configuration corresponding to a kinematic configuration of the drive arrangement. The passive arrangement and the drive arrangement may have corresponding geometries. Each of the drive arrangement and the passive arrangement may comprise an intermediate member, such as an arm.

According to a further aspect, there is provided a system comprising an industrial robot and a positioning apparatus according to the present disclosure.

BRIEF DESCRIPTION OF THE DRAWINGS

Further details, advantages and aspects of the present disclosure will become apparent from the following embodiments taken in conjunction with the drawings, wherein.

DETAILED DESCRIPTION

Figure 1:
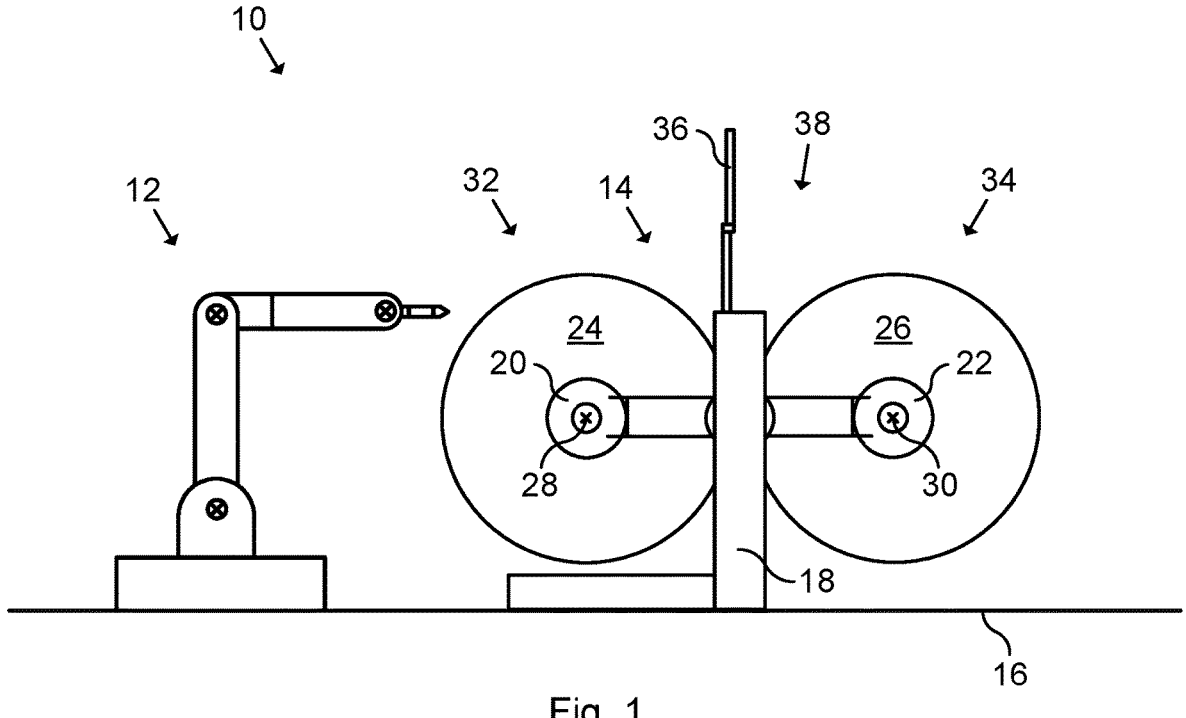
FIG. 1: schematically represents a side view of a system comprising an industrial robot and a positioning apparatus in a first position.

In the following, a positioning apparatus for positioning workpieces in relation to an industrial robot, and a system comprising an industrial robot and a positioning apparatus, will be described. The same or similar reference numerals will be used to denote the same or similar structural features.

FIG. 1 schematically represents a side view of a system 10 comprising an industrial robot 12 and a positioning apparatus 14. In this example, both the industrial robot 12 and the positioning apparatus 14 are positioned directly on a floor 16. The industrial robot 12 of this example is an arc-welding robot comprising six axes, but alternative types of robots may be used.

The positioning apparatus 14 comprises a base structure 18, a first workpiece support 20 and a second workpiece support 22. The first workpiece support 20 releasably supports a first workpiece 24. The second workpiece support 22 releasably supports a second workpiece 26. In this example, each of the workpieces 24 and 26 has a cylindrical shape. Alternative types of workpieces may however be supported by the first workpiece support 20 and the second workpiece support 22.

The first workpiece support 20 is configured to rotate the first workpiece 24 about a horizontal first workpiece axis 28. The second workpiece support 22 is configured to rotate the second workpiece 26 about a horizontal second workpiece axis 30, parallel with the first workpiece axis 28. The first workpiece 24 is clamped between two first workpiece support members (not denoted) of the first workpiece support 20, and the second workpiece 26 is clamped between two second workpiece support members (not denoted) of the second workpiece support 22.

The positioning apparatus 14 comprises a processing side 32 and a loading side 34. The base structure 18 is provided between the processing side 32 and the loading side 34 and is fixed to the floor 16. The positioning apparatus 14 further comprises a wall 36 dividing the processing side 32 and the loading side 34.

In FIG. 1, the positioning apparatus 14 is in a first position 38 such that the first workpiece support 20 supporting the first workpiece 24 is positioned on the processing side 32, and the second workpiece support 22 supporting the second workpiece 26 is positioned on the loading side 34. When the positioning apparatus 14 adopts the first position 38, the industrial robot 12 can perform an operation, here an arc-welding operation, on the first workpiece 24 on the processing side 32. At the same time, the second workpiece 26 has been added to the second workpiece support 22 on the loading side 34. As shown in FIG. 1, the first workpiece support 20 and the second workpiece support 22 are positioned at the same low geodetic height in the first position 38 of the positioning apparatus 14.

Figure 2:
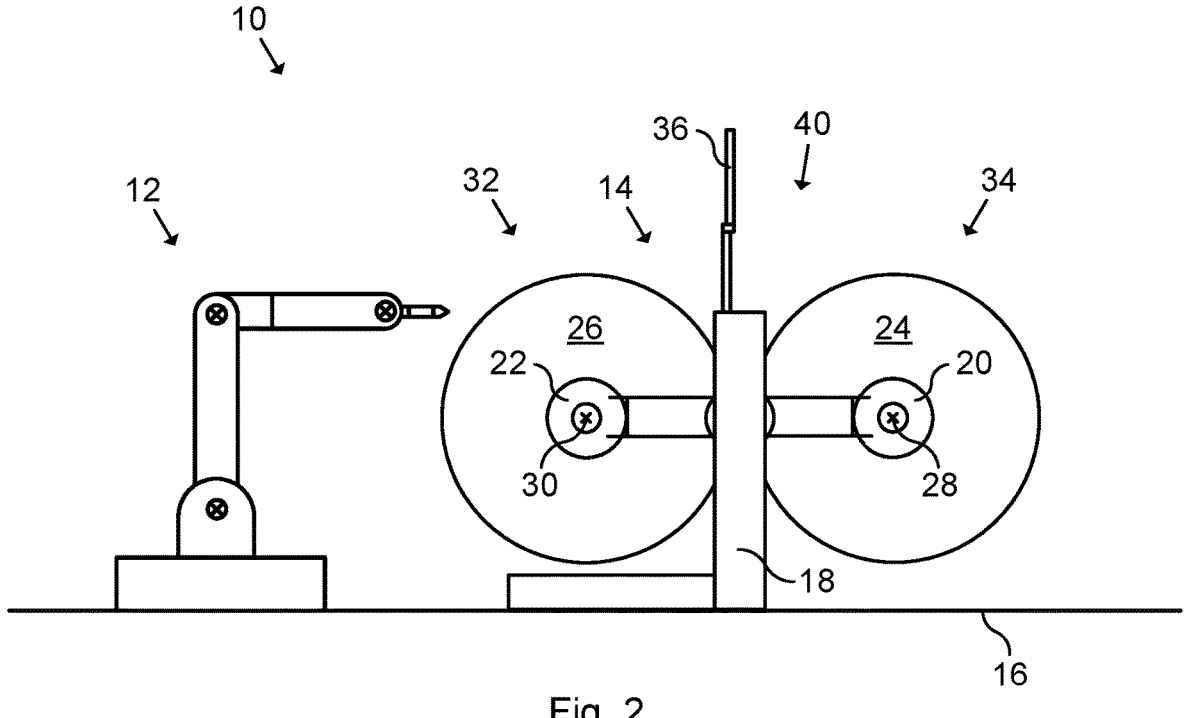
FIG. 2: schematically represents the system when the positioning apparatus is in a second position.

FIG. 2 schematically represents the system 10 when the positioning apparatus 14 is in a second position 40. In the second position 40, the second workpiece support 22 supporting the second workpiece 26 is now positioned on the processing side 32, and the first workpiece support 20 supporting the first workpiece 24 is positioned on the loading side 34. As shown in FIG. 2, the first workpiece support 20 and the second workpiece support 22 are positioned at the same low geodetic height also in the second position 40 of the positioning apparatus 14.

The first workpiece 24, which has been processed by the industrial robot 12, can now be removed from the first workpiece support 20, and a third workpiece (not shown) can be added to the first workpiece support 20 while the second workpiece 26 is being processed by the industrial robot 12 at the processing side 32.

As shown in FIGS. 1 and 2, each workpiece 24 and 26 is positioned at a low geodetic height in each of the first position 38 and the second position 40 of the positioning apparatus 14. Thus, ergonomics is improved, a pedestal for the industrial robot 12 can be avoided or reduced in height, and a ladder or programming platform for maintenance personnel or programmers can be avoided.

Figure 3:
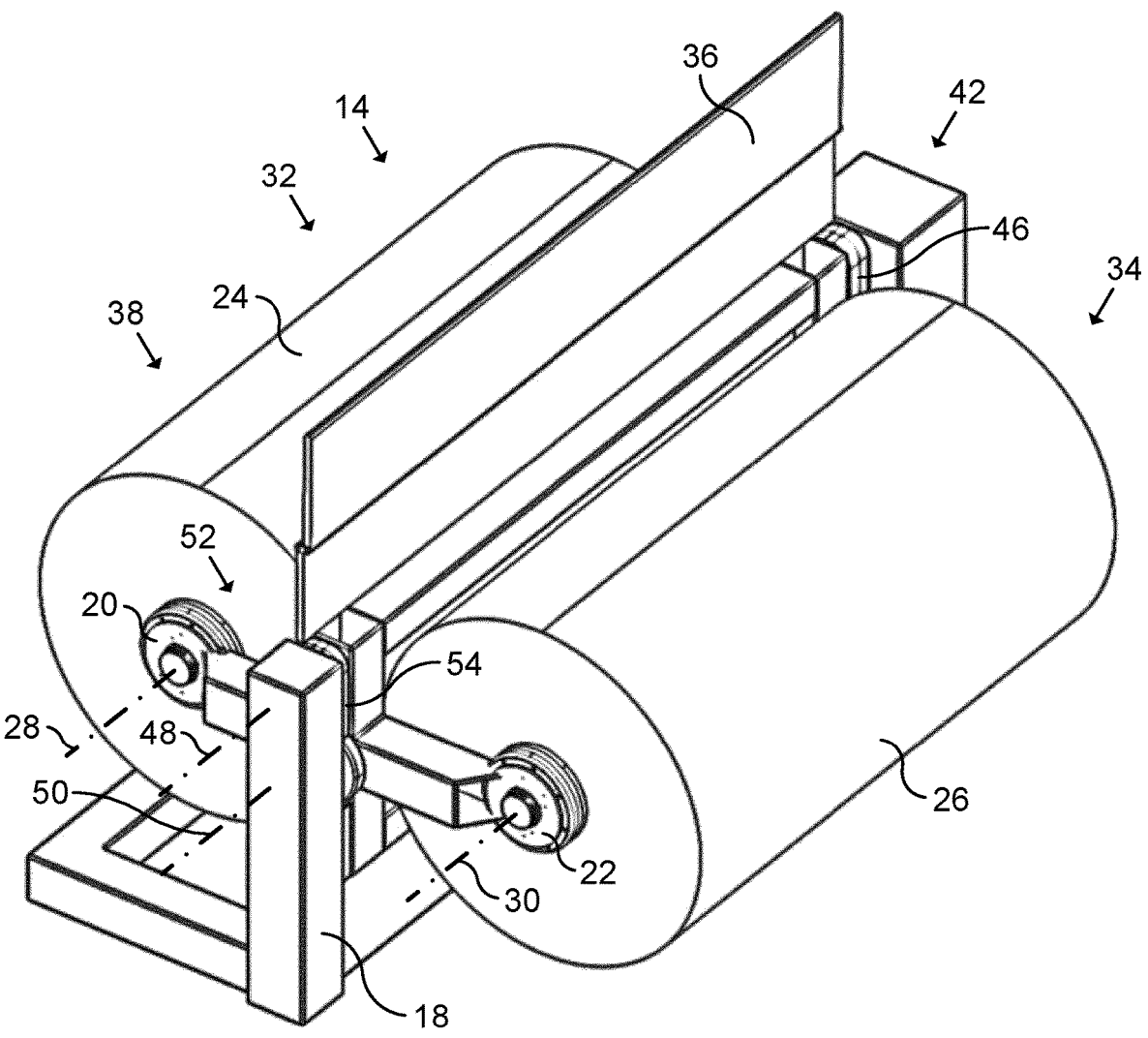
FIG. 3: schematically represents a perspective view of the positioning apparatus in the first position.
Figure 4:
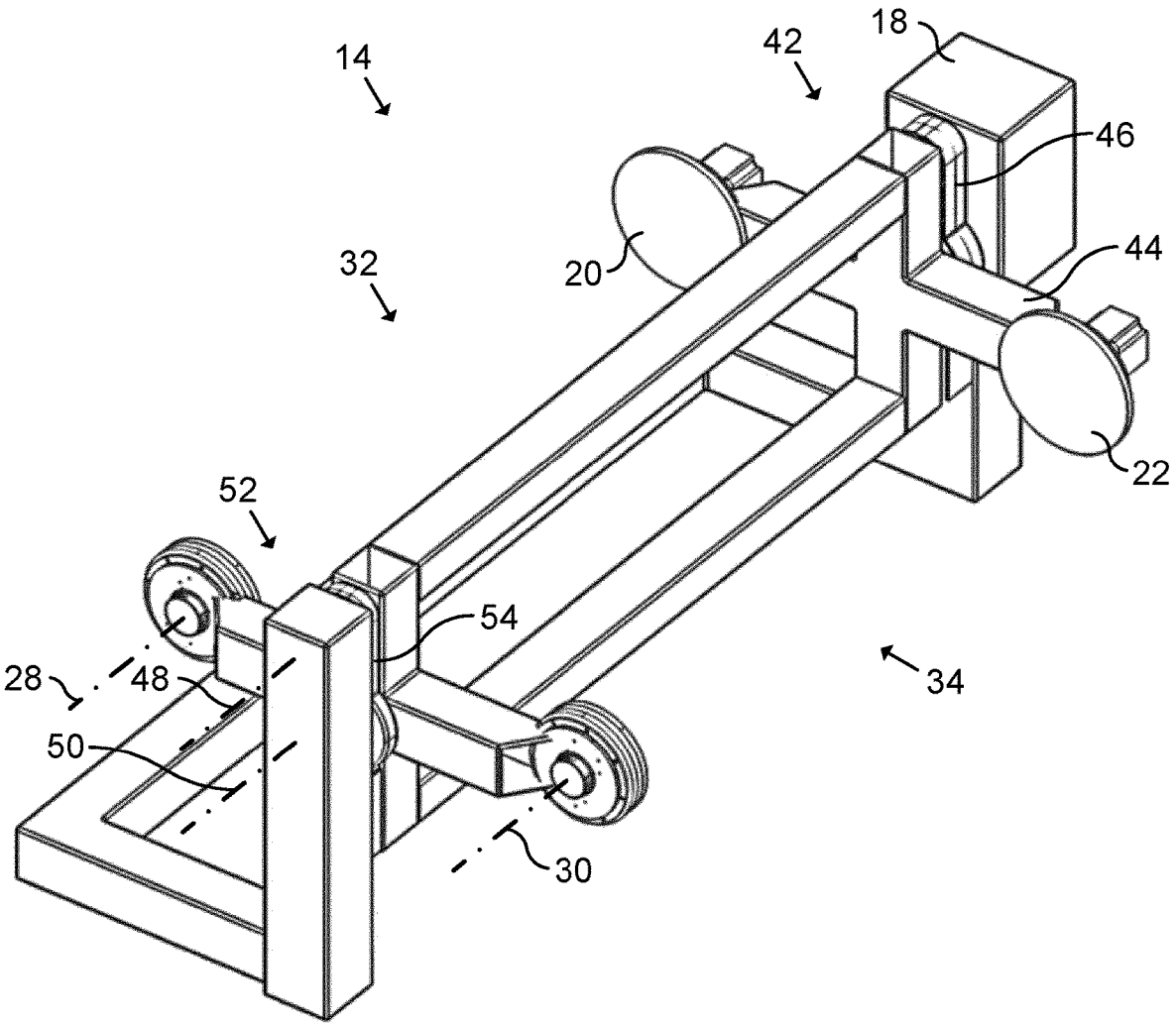
FIG. 4: schematically represents a further perspective view of the positioning apparatus.

FIG. 3 schematically represents a perspective view of the positioning apparatus 14. FIG. 4 schematically represents a further perspective view of the positioning apparatus 14. In FIG. 4, the workpieces 24 and 26 and the wall 36 are removed to increase visibility. In each of FIGS. 3 and 4, the positioning apparatus 14 is positioned in the first position 38.

With collective reference to FIGS. 3 and 4, the positioning apparatus 14 further comprises a drive arrangement 42 and a support member 44. The support member 44 supports the first workpiece support 20 and the second workpiece support 22. The support member 44 is here exemplified as a rigid frame.

The drive arrangement 42 comprises an intermediate member 46, here exemplified as an arm. The intermediate member 46 is arranged between the base structure 18 and the support member 44.

FIGS. 3 and 4 further show a horizontal primary rotation axis 48 and a horizontal secondary rotation axis 50. The primary rotation axis 48 and the horizontal secondary rotation axis 50 are parallel. The primary rotation axis 48 is arranged between the base structure 18 and the intermediate member 46. The secondary rotation axis 50 is arranged between the intermediate member 46 and the support member 44.

The drive arrangement 42 is configured to drive the intermediate member 46 relative to the base structure 18 for rotation about the primary rotation axis 48. The drive arrangement 42 is further configured to drive the support member 44 relative to the intermediate member 46 for rotation about the secondary rotation axis 50.

The drive arrangement 42 is arranged to drive the support member 44 relative to the base structure 18 from the first position 38 to the second position 40, i.e. such that also the positioning apparatus 14 also adopts the first position 38 and the second position 40, respectively. To this end, the drive arrangement 42 is arranged to drive rotation of the intermediate member 46 relative to the base structure 18 about the primary rotation axis 48 and to drive rotation of the support member 44 relative to the intermediate member 46 about the secondary rotation axis 50 during movement of the support member 44 from the first position 38 to the second position 40.

The drive arrangement 42 of this example comprises a single motor (not shown) for driving the intermediate member 46 about the primary rotation axis 48 relative to the base structure 18, and for driving the support member 44 about the secondary rotation axis 50 relative to the intermediate member 46, during driving of the support member 44 between the first position 38 and the second position 40.

The positioning apparatus 14 further comprises a passive arrangement 52. The passive arrangement 52 is, together with the drive arrangement 42, arranged to kinematically define the position of the support member 44 in relation to the base structure 18. As shown in FIG. 4, the support member 44 is arranged between the drive arrangement 42 and the passive arrangement 52. Moreover, the passive arrangement 52 and the drive arrangement 42 have corresponding kinematic configurations and the same geometries.

The passive arrangement 52 comprises an intermediate passive member 54, here exemplified as an arm. The intermediate passive member 54 is arranged to rotate relative to the base structure 18 about the primary rotation axis 48 by means of a bearing (not shown). The support member 44 is arranged to rotate relative to the intermediate passive member 54 about the secondary rotation axis 50 by means of a bearing (not shown).

As shown in FIG. 4, the first workpiece support 20 comprises two first workpiece support members (not denoted) arranged to hold the first workpiece 24 therebetween, and the second workpiece support 22 comprises two second workpiece support members (not denoted) arranged to hold the second workpiece 26 therebetween. The first workpiece support 20 and the second workpiece support 22 may however be configured to support workpieces 24 and 26 in alternative ways.

The first workpiece support 20 comprises a motor and a reduction gearbox (not shown) on the active side, i.e. adjacent to the drive arrangement 42, for driving rotation of the first workpiece 24 about the first workpiece axis 28. The second workpiece support 22 comprises a motor and a reduction gearbox (not shown) on the active side for driving rotation of the second workpiece 26 about the second workpiece axis 30. For each of the first workpiece support 20 and the second workpiece support 22, the respective motor and reduction gearbox may alternatively be provided on the passive side, i.e. adjacent to the passive arrangement 52.

Figure 5:
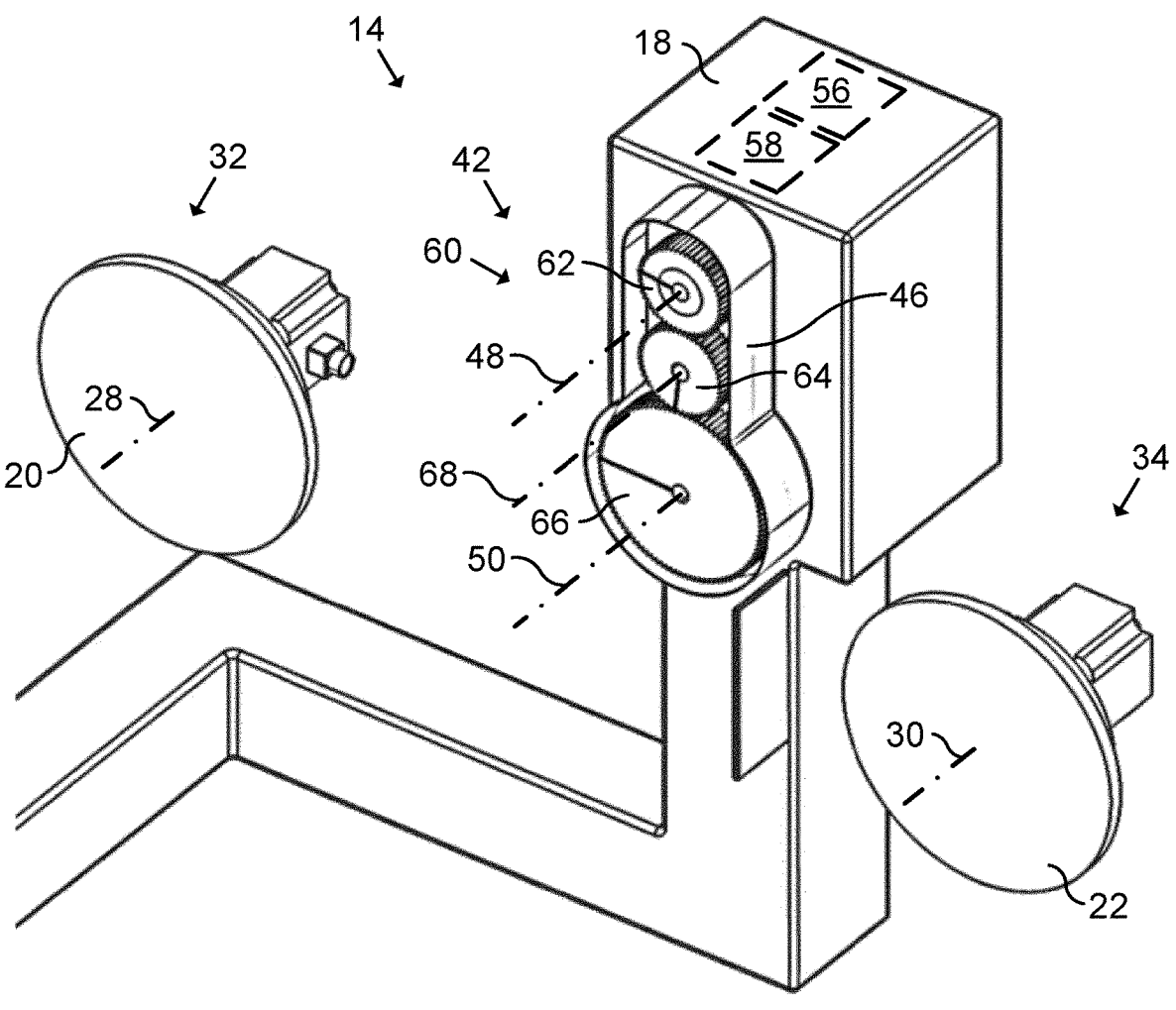
FIG. 5: schematically represents a partial perspective view of the positioning apparatus.

FIG. 5 schematically represents a partial perspective view of the positioning apparatus 14. In FIG. 5, the support member 44 has been removed for improved visibility.

As shown in FIG. 5, the drive arrangement 42 comprises a motor 56, here exemplified as an electric servomotor. The drive arrangement 42 further comprises a reduction gearbox 58. The gearbox 58 is arranged between the motor 56 and intermediate member 46. The motor 56 is arranged to drive the intermediate member 46 to rotate relative to the base structure 18 about the primary rotation axis 48.

The motor 56 and the gearbox 58 are arranged in the base structure 18. In this example, the drive arrangement 42 is arranged to drive the support member 44 from the first position 38 to the second position 40, by rotation of the intermediate member 46 relative to the base structure 18 about the primary rotation axis 48 and by rotation of the support member 44 relative to the intermediate member 46 about the secondary rotation axis 50, with the motor 56 as the only power source.

As shown in FIG. 5, the drive arrangement 42 comprises a transmission 60. The transmission 60 of this example comprises a first gear wheel 62, a second gear wheel 64 meshing with the first gear wheel 62, and a third gear wheel 66 meshing with the second gear wheel 64. In this example, each of the first gear wheel 62, the second gear wheel 64 and the third gear wheel 66 is a spur gear.

The first gear wheel 62 is concentric with the primary rotation axis 48 and is fixed to the base structure 18. The second gear wheel 64 is rotatably connected to the intermediate member 46 for rotation relative to the intermediate member 46 about a second gear wheel axis 68. The third gear wheel 66 is concentric with the secondary rotation axis 50 and is fixed to the support member 44. The first gear wheel 62 constitutes an input wheel and the third gear wheel 66 constitutes an output wheel.

In this example, a gear ratio between the first gear wheel 62 and the third gear wheel 66 is 2:1. The first gear wheel 62 and the second gear wheel 64 have the same size and the same number of teeth. The third gear wheel 66 is larger and has twice as many teeth as the first gear wheel 62 and the second gear wheel 64.

The system 10 may comprise a control system (not shown), such as a robot controller. In addition to controlling movements of the respective axes of the industrial robot 12, the control unit of this example also controls the drive of the motor 56 and of the motor associated with each of the first workpiece support 20 and the second workpiece support 22.

In the following, movement of the support member 44 relative to the base structure 18 from the first position 38 to the second position 40 will be described.

Figure 6:
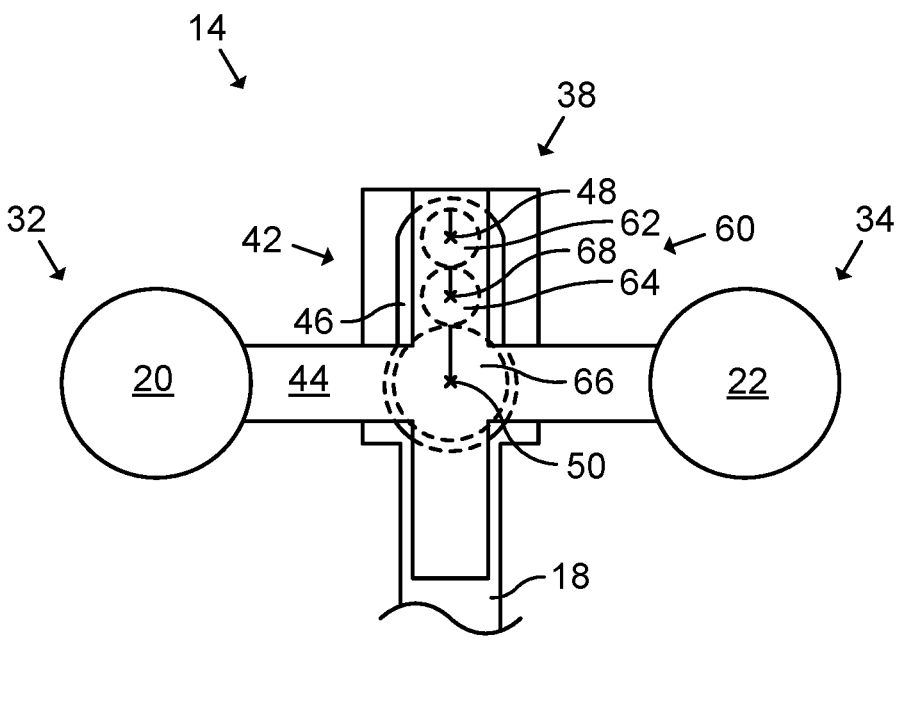
FIG. 6: schematically represents a partial side view of the positioning apparatus in the first position.

FIG. 6 schematically represents a partial side view of the positioning apparatus 14 in the first position 38. As shown in FIG. 6, the secondary rotation axis 50, the first workpiece axis 28 and the second workpiece axis 30 are positioned at the same geodetic height in the first position 38.

When the intermediate member 46 is rotationally driven counterclockwise about the primary rotation axis 48 relative to the base structure 18 by the motor 56, the rotation of the intermediate member 46 is transferred to a counterclockwise rotation of the second gear wheel 64 about the second gear wheel axis 68. The rotation of the second gear wheel 64 about the second gear wheel axis 68 causes the support member 44 to be rotationally driven clockwise about the secondary rotation axis 50 relative to the intermediate member 46. However, the angular rotational speed of the intermediate member 46 about the primary rotation axis 48 is twice as fast as the angular rotational speed of the support member 44 about the secondary rotation axis 50.

When the drive arrangement 42 drives the support member 44 from the first position 38 towards the second position 40, movements take place in each of the primary rotation axis 48 and the secondary rotation axis 50.

Figure 7:
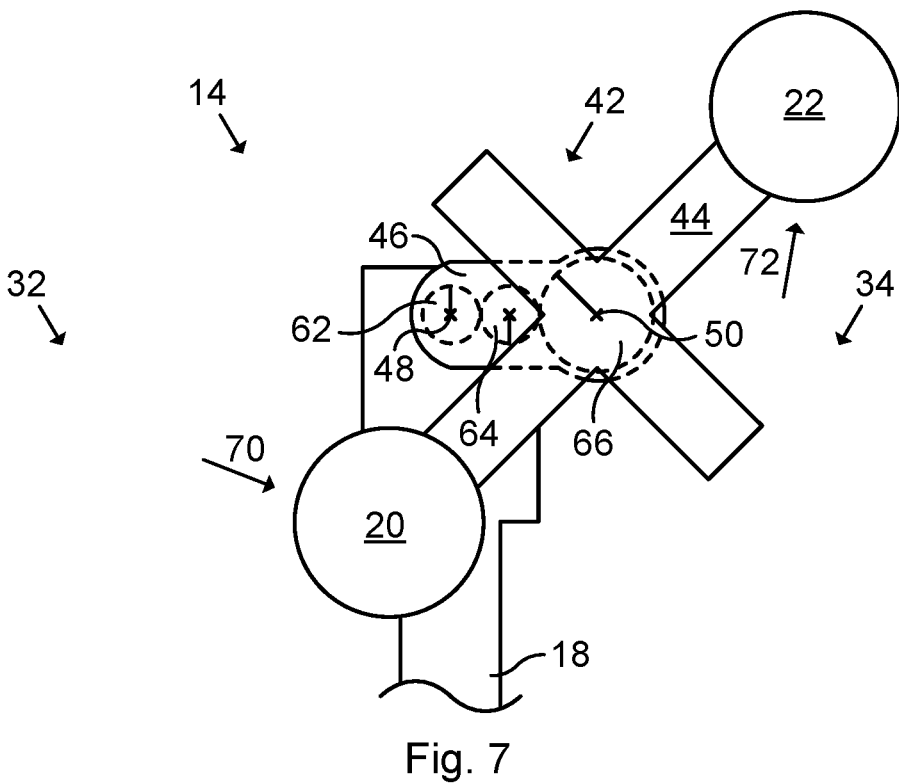
FIG. 7: schematically represents a partial side view of the positioning apparatus during movement from the first position to the second position.

FIG. 7 schematically represents a partial side view of the positioning apparatus 14 during movement from the first position 38 to the second position 40. In FIG. 7, the intermediate member 46 has rotated 90° counterclockwise relative to the base structure 18 about the primary rotation axis 48 and the support member 44 has rotated 45° clockwise relative to the intermediate member 46 about the secondary rotation axis 50. Movement of the first workpiece support 20 is illustrated with arrow 70 and movement of the second workpiece support 22 is illustrated with arrow 72.

As shown in FIG. 7, the first workpiece support 20 is closer to the primary rotation axis 48 than in FIG. 6 and the second workpiece support 22 is further away from the primary rotation axis 48 than in FIG. 6. Thus, during movement of the support member 44 from the first position 38 to the second position 40, the distance between the first workpiece support 20 and the primary rotation axis 48 and the distance between the second workpiece support 22 and the primary rotation axis 48 vary.

Figure 8:
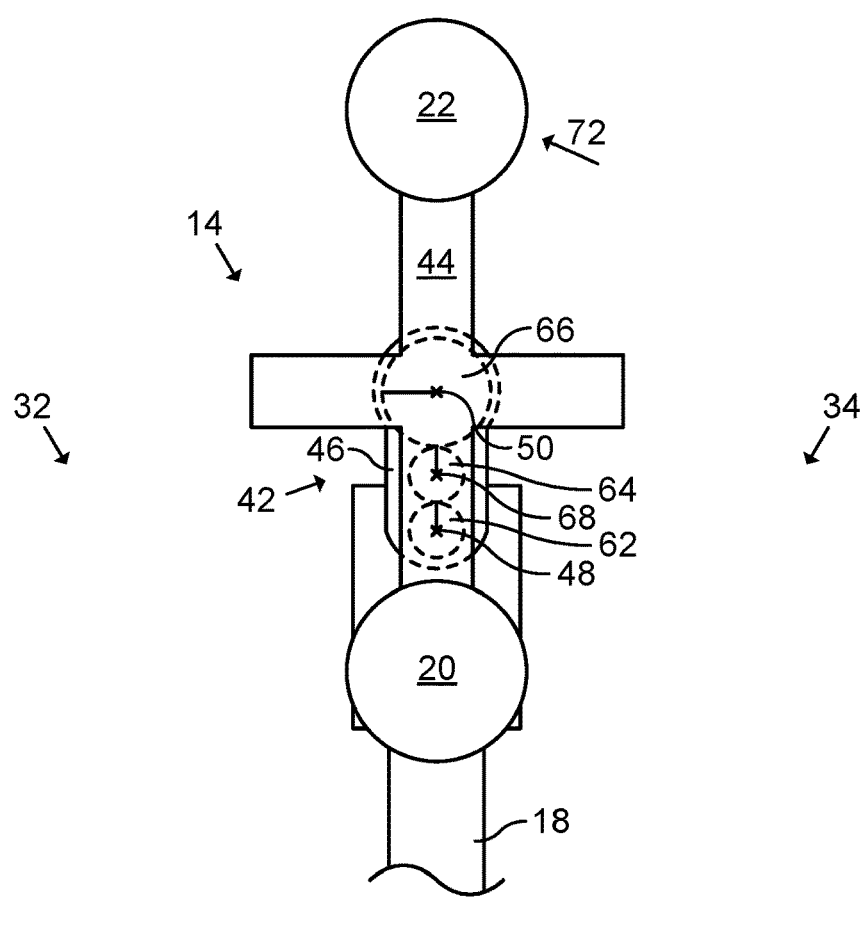
FIG. 8: schematically represents a partial side view of the positioning apparatus during further movement from the first position to the second position.

FIG. 8 schematically represents a partial side view of the positioning apparatus 14 during further movement from the first position 38 to the second position 40. In FIG. 8, the intermediate member 46 has rotated 180° counterclockwise relative to the base structure 18 about the primary rotation axis 48 and the support member 44 has rotated 90° clockwise relative to the intermediate member 46 about the secondary rotation axis 50. In FIG. 8, the first workpiece support 20 is temporarily at standstill.

Figure 9:
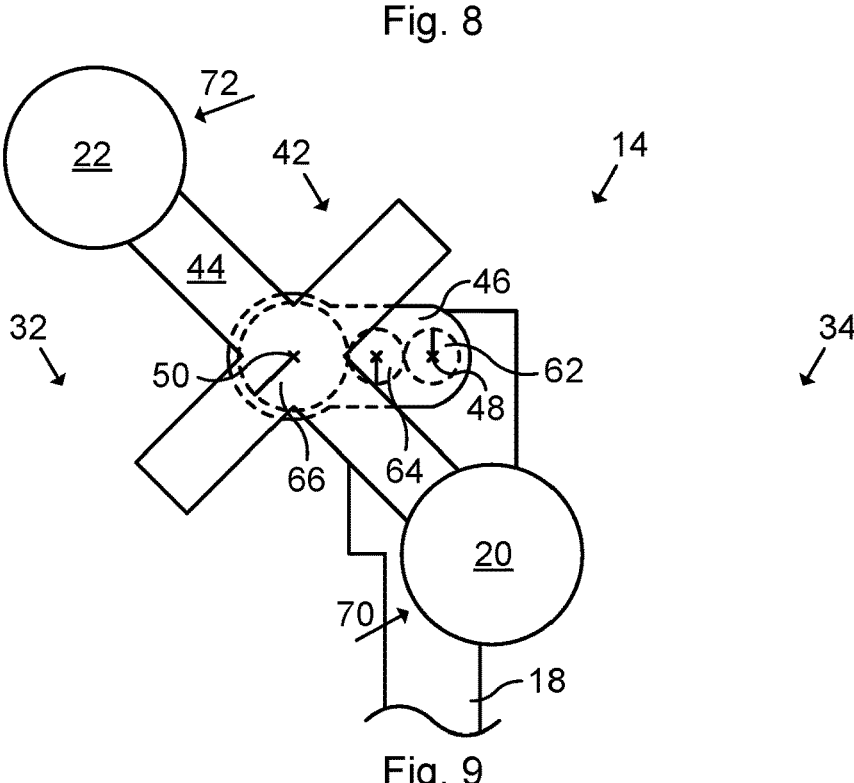
FIG. 9: schematically represents a partial side view of the positioning apparatus during further movement from the first position to the second position.

FIG. 9 schematically represents a partial side view of the positioning apparatus 14 during further movement from the first position 38 to the second position 40. In FIG. 9, the intermediate member 46 has rotated 270° counterclockwise relative to the base structure 18 about the primary rotation axis 48 and the support member 44 has rotated 135° clockwise relative to the intermediate member 46 about the secondary rotation axis 50.

Figure 10:
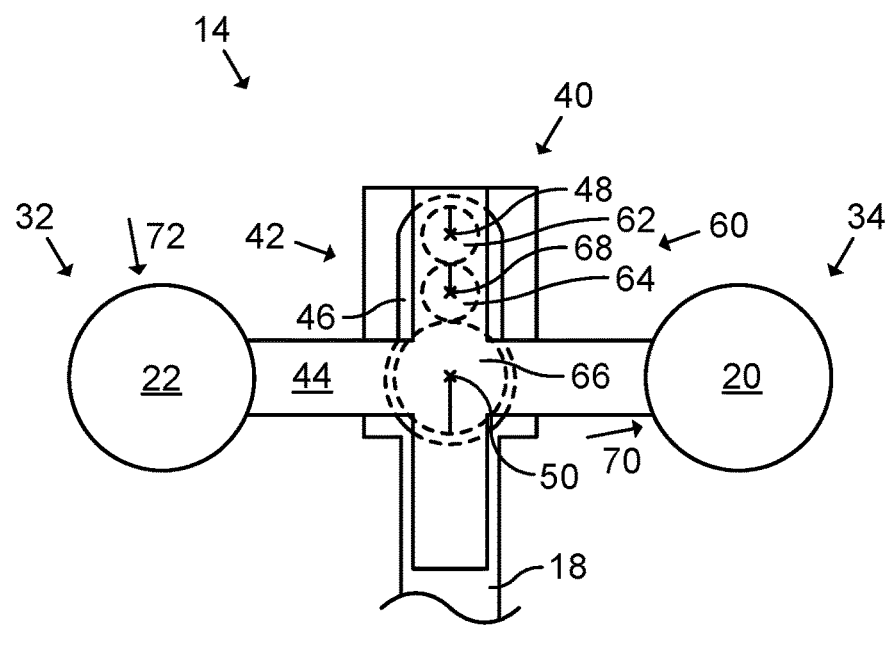
FIG. 10: schematically represents a partial side view of the positioning apparatus in the second position.

FIG. 10 schematically represents a partial side view of the positioning apparatus 14 when the support member 44 has reached the second position 40. As shown in FIG. 10, the secondary rotation axis 50, the first workpiece axis 28 and the second workpiece axis 30 are again positioned at the same geodetic height in the second position 40.

In the second position 40 in FIG. 10, the intermediate member 46 has rotated 360° counterclockwise relative to the base structure 18 about the primary rotation axis 48 from the first position 38 and the support member 44 has rotated 180° clockwise relative to the intermediate member 46 about the secondary rotation axis 50 from the first position 38. The support member 44 has thereby performed a compound movement between the first position 38 and the second position 40.

Figure 11:
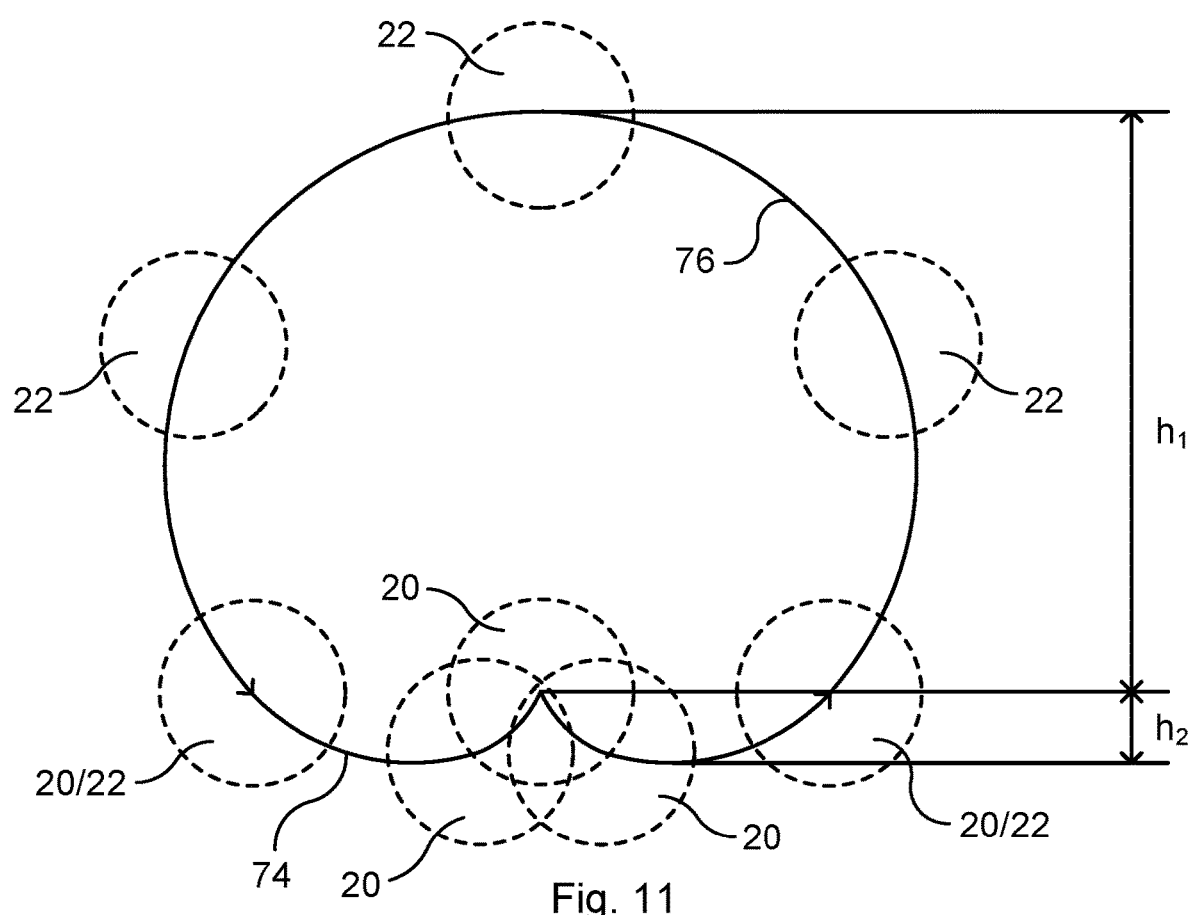
FIG. 11: schematically represents paths of a first workpiece support and a second workpiece support.
Figure 12:
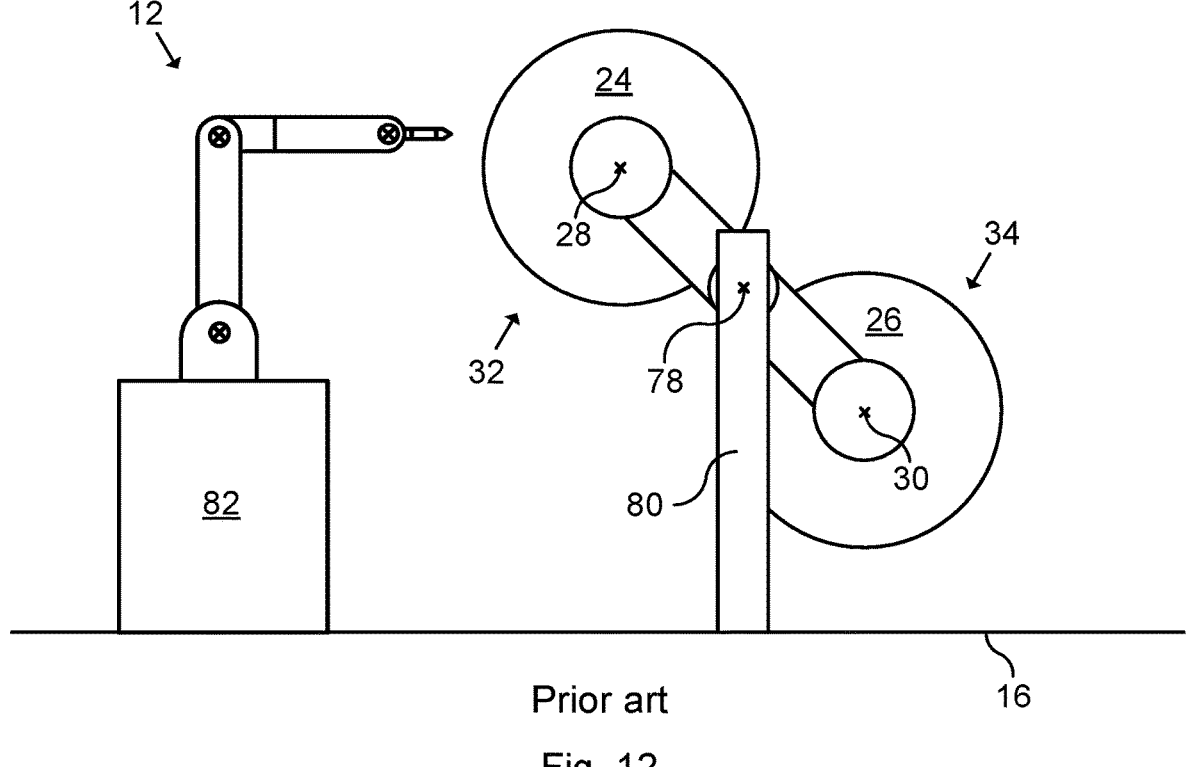
FIG. 12: schematically represents a side view of a system comprising an industrial robot and a workpiece positioner according to the prior art.

As shown in FIG. 11, the drive arrangement 42 drives the first workpiece support 20 and the second workpiece support 22 along a respective non-circular path when driving the support member 44 from the first position 38 to the second position 40. The first workpiece support 20 has moved from the processing side 32 in the first position 38 below the second workpiece support 22 to the loading side 34 in the second position 40 along a relatively short generally double arc-shaped path 74. At the same time, the second workpiece support 22 has moved from the loading side 34 in the first position 38 above the first workpiece support 20 to the processing side 32 in the second position 40 along a relatively long elliptic or generally arc-shaped path 76. As shown in FIG. 11, a vertical height $h_1$ of the path 76 is more than five times as large as a vertical height $h_2$ of the path 74.

If the support member 44 would only have been rotatable relative to the base structure 18 about the primary rotation axis 48, the primary rotation axis 48 would have to be positioned at a larger height in order to allow rotation of the support member 44. Thus, the base structure 18 would have to be made higher. However, due to the non-circular paths 74, 76, the positioning apparatus 14 is made relatively compact and at the same time allows each workpiece 24 and 26 to be positioned at a low geodetic height in each of the first position 38 and the second position 40. Except for the central vertical position of the support member 44 according to FIG. 8, the height of the positioning apparatus 14 is relatively low. That is, the positioning apparatus 14 only requires a relatively small height at the processing side 32 and the loading side 34.

In order to move the support member 44 relative to the base structure 18 from the second position 40 back to the first position 38, the above procedure may be reversed. That is, the intermediate member 46 may be driven clockwise about the primary rotation axis 48 during movement from the second position to the first position 38. Alternatively, the intermediate member 46 may be rotationally driven repeatedly in only one direction about the primary rotation axis 48 in order to move the support member 44 from the first position 38 to the second position 40 and to the first position 38 again.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

The invention claimed is:

1. A positioning apparatus for positioning workpieces in relation to an industrial robot, the positioning apparatus comprising:

a base structure;

a first workpiece support for supporting a first workpiece;

a second workpiece support for supporting a second workpiece;

a support member supporting the first workpiece support and the second workpiece support; and a drive arrangement arranged to drive the support member relative to the base structure from a first position, where the first workpiece support is positioned on a processing side of the base structure and the second workpiece support is positioned on an opposite loading side of the base structure, to a second position, where the first workpiece support is positioned on the loading side and the second workpiece support is positioned on the processing side;

wherein the drive arrangement is arranged to drive the first workpiece support along a first path and the second workpiece support along a second path when driving the support member from the first position to the second position, the first and second paths being non-circular.

2. The positioning apparatus according to claim 1, wherein in each of the first position and the second position, the first workpiece support and the second workpiece support are positioned at substantially the same geodetic height.

3. The positioning apparatus according to claim 2, wherein one of the first and second paths is above the other one and has a first vertical height, and the other one is below and has a second vertical height, wherein the first vertical height is larger than the second vertical height.

4. The positioning apparatus according to claim 2, wherein the drive arrangement comprises a motor, and wherein the drive arrangement is arranged to drive the support member from the first position to the second position with the motor as the sole power source.

5. The positioning apparatus according to claim 2, wherein the drive arrangement comprises an intermediate member between the base structure and the support member, and a substantially horizontal primary rotation axis between the base structure and the intermediate member.

6. The positioning apparatus according to claim 1, wherein one of the first and second paths is above the other one and has a first vertical height, and the other one is below and has a second vertical height, wherein the first vertical height is larger than the second vertical height.

7. The positioning apparatus according to claim 6, wherein the first vertical height is at least two times larger than the second vertical height.

8. The positioning apparatus according to claim 6, wherein the first vertical height is at least three times larger than the second vertical height.

9. The positioning apparatus according to claim 1, wherein the drive arrangement comprises a motor, and wherein the drive arrangement is arranged to drive the support member from the first position to the second position with the motor as the sole power source.

10. The positioning apparatus according to claim 1, wherein the drive arrangement comprises an intermediate member between the base structure and the support member, and a substantially horizontal primary rotation axis between the base structure and the intermediate member.

11. The positioning apparatus according to claim 10, wherein the drive arrangement is arranged to rotate the intermediate member approximately 360° about the primary rotation axis when driving the support member from the first position to the second position.

12. The positioning apparatus according to claim 10, wherein the drive arrangement is arranged to drive the support member from the first position to the second position such that a distance between the first workpiece support and the primary rotation axis and/or a distance between the second workpiece support and the primary rotation axis varies.

13. The positioning apparatus according to claim 10, wherein the drive arrangement comprises a motor arranged to drive the intermediate member about the primary rotation axis.

14. The positioning apparatus according to claim 10, wherein the drive arrangement comprises a substantially horizontal secondary rotation axis between the intermediate member and the support member, the secondary rotation axis being parallel with the primary rotation axis, and wherein the support member is arranged to rotate relative to the base structure about the secondary rotation axis.

15. The positioning apparatus according to claim 13, wherein the drive arrangement is arranged to rotate the support member approximately 180° about the secondary rotation axis when driving the support member from the first position to the second position.

16. The positioning apparatus according to claim 14, wherein the drive arrangement comprises a transmission having an input wheel fixed with respect to the base structure and an output wheel fixed with respect to the support member, and wherein a gear ratio between the input wheel and the output wheel is 2:1.

17. The positioning apparatus according to claim 14, wherein the drive arrangement comprises a stationary first gear wheel concentric with the primary rotation axis, a second gear wheel meshing with the first gear wheel and rotatably connected to the intermediate member, and a third gear wheel meshing with the second gear wheel, fixed with respect to the support member and concentric with the secondary rotation axis.

18. The positioning apparatus according to claim 1, further comprising a passive arrangement, wherein the passive arrangement is, together with the drive arrangement, arranged to kinematically define the position of the support member in relation to the base structure.

19. The positioning apparatus according to claim 18, wherein the passive arrangement comprises a passive kinematic configuration corresponding to a kinematic configuration of the drive arrangement.

20. A system comprising an industrial robot and a positioning apparatus comprising:

a base structure;

a first workpiece support for supporting a first workpiece;

a second workpiece support for supporting a second workpiece;

a support member supporting the first workpiece support and the second workpiece support; and a drive arrangement arranged to drive the support member relative to the base structure from a first position, where the first workpiece support is positioned on a processing side of the base structure and the second workpiece support is positioned on an opposite loading side of the base structure, to a second position, where the first workpiece support is positioned on the loading side and the second workpiece support is positioned on the processing side;

wherein the drive arrangement is arranged to drive the first workpiece support along a first path and the second workpiece support along a second path when driving the support member from the first position to the second position, the first and second paths being non-circular.

* * * * *